United States Patent Office 2,779,388
Patented Jan. 29, 1957

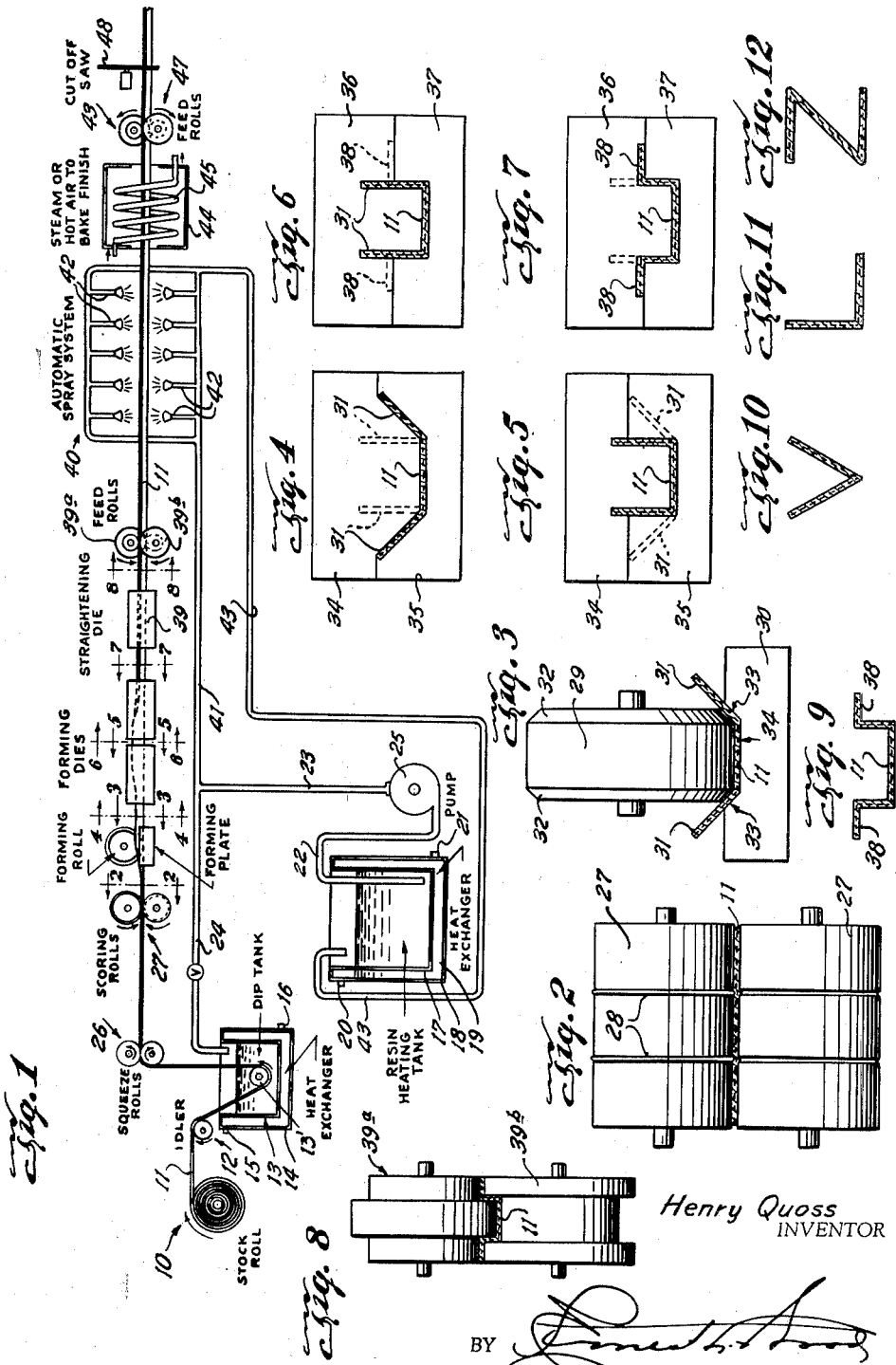

2,779,388

APPARATUS AND METHOD OF FORMING ELONGATE ARTICLES FROM FIBERGLAS

Henry N. Quoss, Dallas, Tex.

Application August 2, 1954, Serial No. 447,228

5 Claims. (Cl. 154—30)

This invention relates to the forming of various cross-sectional shapes in a web of thermo-setting or polyester resins and it refers more particularly to an improved apparatus and method of accomplishment.

The continuous forming of useful shapes from contact pressure resins is not broadly new but for the most part, these shapes have been produced by using as a core or base laminated webs of woven fabrics which are impregnated with a heat hardening pressure resin preliminary to the gradual shaping of the web during the hardening process. Such a method involves the assembling together of a plurality of fabric webs which entails the problem of keeping the webs in alignment, excluding wrinkles and consequent air pockets and the further problem of insuring a smooth and unblemished surface on the finished product.

It is the principal object of the present invention to produce various cross-sectional shapes from a continuous web of thermo-setting resin, preferably of the type known to the trade as "Fiberglas," the shapes being adaptable, for example, as window frames, sash frames, channel stock, angle stock and many other shapes formed of a material known to possess great tensile and compressive strength and weather resistant characteristics, without the need for materials other than the resin itself.

Another object of the invention is to provide a method for producing various cross-sectional shapes in a continuous web of thermo-setting resin by passing the resin web through a dip tank through which the resin is continuously circulated at a predetermined temperature, after which the resin coated web is drawn between scoring rolls preparatory to forming into predetermined shape by the gradual process of evolvement by means of dies which are adjustable in relation to each other along the longitudinal path traveled by the web to insure their proper positions with respect to the changing degrees of plasticity of the web as it moves from stage to stage in the forming process. The invention further provides for the spraying of the shaped web with a finish coating of resin after the initial resin coat has reached the gel stage, followed by the final step of baking the finish coat by passing the web through a zone uniformly heated by air or steam.

Other objects will appear as the description proceeds when considered with the annexed drawing, wherein:

Figure 1 is schematic side elevational view of the apparatus for carrying out the method herein described.

Figure 2 is a view taken on line 2—2 of Figure 1 showing the scoring rolls on a larger scale.

Figure 3 is a sectional view taken on line 3—3 of Figure 1 showing the initial forming roll and plate on a larger scale.

Figure 4 is an enlarged end view of one of the forming dies, taken on line 4—4 of Figure 1.

Figure 5 is a similar view taken on line 5—5 of Figure 1.

Figure 6 is an end elevational view of a companion forming die taken on line 6—6 of Figure 1.

Figure 7 is a view on line 7—7 of Figure 1, showing the opposite end of said companion forming die.

Figure 8 is a view taken on line 8—8 of Figure 1 showing an enlarged view of the feed rolls, and Figures 9, 10, 11 and 12 are transverse sectional views of various shapes produced by the herein described method.

Continuing with a more detailed description of the drawing, reference numeral 10 denotes a stock roll of thermo-setting resin web 11 which is caused to pass over an idler roller 12 and into a dip tank 13, under a roller 13' journaled therein and out of the tank to receive further treatment later explained.

Within the tank 13 is maintained a quantity of resin at a predetermined level. Since the type of thermo-setting resin most suited for the purpose starts to gel at 180° F. (82.2° C.) in four minutes after leaving the tank 13, it is important that the temperature of the contents of the tank 13 be uniformly kept well above 180° F. This is accomplished by means of a heat exchanger in the form of a jacket 14 surrounding the tank 13, through which hot water is continuously circulated through an inlet 15 and an outlet 16.

In order to replenish the tank 13 and to maintain the required level of resin therein, a resin recirculating system is provided, consisting of a reservoir or tank 17 which is also equipped with a jacket 18 to define a space 19 through which hot water is circulated by means of the inlet 20 and outlet 21. Actually, the resin is preheated in the tank 17 and reheated in the dip tank 13 after having been transferred from tank 17 to tank 13 through pipes 22, 23 and 24 by means of a pump 25 interposed between pipes 22 and 23. This circulating system serves the dual purpose of replenishing tank 13 to provide the initial coating of the resin web and for the application of the filler or final coat after the web had been formed into the desired shape by dies, which will be again referred to presently.

The rate of gel of the resin predetermines the relative spacing of the various elements of the invention which have to do with the changing of the shape of the web which is accomplished in a series of steps. The step in the process next succeeding the initial coating of the web 11 is the squeezing of the latter between squeeze rolls 26 to remove excess resin and to distribute the deposited resin evenly on the plastic web. The web continues between a pair of scoring rolls 27, shown on a larger scale in Figure 2 and which impose in the web longitudinal score lines by means of spaced apart, circumferential ribs 28, the score lines constituting the initial physical change in the web 11 and serve to facilitate other changes toward the final form or cross-sectional shape which, in the present case, is the flanged channel shown in Figure 9.

Following the scoring operation by rolls 27, the web is passed under a forming roll 29 (Figure 3) which cooperates with a forming plate 30 to produce initial longitudinal bends in the web 11 originating at the score lines therein to form angles 31 of approximately 45°. These angles are formed by peripheral bevels 32 on the roll 29 which match with corresponding angular edges 33 of the longitudinal channel 34 formed in the plate 30 in which the plastic web 11 travels as it is compressed by the tread of the roll 29.

After emerging from between the forming roll and plate 29 and 30, respectively, the web enters between complementary forming dies 34 and 35 (Figure 4). These matching dies are made so that the forming space at the entrance end is of the same shape as the cross-sectional shape of the web 1 as it emerges from the forming roll and plate, but gradually assumes a substantially U-shape as seen in dotted lines in Figure 4 and in solid lines in Figure 5, at the exit end of the die set. In this manner, the web 11 gradually attains the U-shape imposed by the dies 34 and 35.

Adjustable longitudinally in relation to the die set composed of the dies 34 and 35 is another die set consisting of upper and lower dies 36 and 37, respectively (Figures 6 and 7) between which the web 11, still in a plastic state, is caused to travel in order to form the flanges 38. As in the case of the dies 34 and 35, the space between the dies 36 and 37 at the entrance end corresponds with the cross-sectional shape of the web 11 as it emerges from the die set 34—35 and the sides 31 of the web are gradually turned intermediate their tops and bottoms into right angular flanges 38. Figure 6 is a view taken at the entrance end of the die set 36—37 and Figure 7 is a similar view of the exit end of this die set and shows the web 11 in its final form as revealed in Figure 9 per se.

The relative positions of the squeeze roll 26; scoring rolls 27; forming roll and plate 29—30; die set 34—35 and die set 36—37 must be determined by the rate of gel of the plastic coating as well as the web carrier 11, itself. As stated, the particular resin employed starts to gel at 180° F. in four minutes from the heated zone or the tank 13. Accordingly, the spacing of these various elements is such that the web does not become set until it is completely formed by the last die set 36—37 and is guided into a straightening die 39 (Figure 1) by feed rolls 39a and 39b whose peripheries are shaped to conform to the upper and lower edges, respectively, of the web 11 (Figure 8). The die 39 is made in upper and lower sections between which the passage for the web 11 is of the same shape as the passage between dies 36 and 37 at their exit ends as shown in Figure 7, the space or passage in the straightening die being of the same shape in transverse section taken at any point between the ends of the die. This die is for the purpose of insuring against any irregularities in the web in the last stages of gel prior to the passage of the web through the spraying zone 40 (Figure 1).

The spraying zone 40 consists of a closed space or chamber (not shown) into which passes a pipe 41 which communicates at one end with pipe 23, the latter, in turn, being connected to the pump 25, as earlier described. Resin in liquid form is pumped through line 41 to supply spray heads 42 which apply to both sides of the web 11 a filler coat of resin. The resin which is not released through the spray heads 42 is returned to the tank 17 through pipe 43 for reheating and recirculation between the spray heads and the dip tank 13. This operation is continuous as long as a web of thermo-setting resin is passed through the apparatus in the manner explained.

After the web 11 has been sprayed, the filler coating is uniformly hardened by heating the coated web uniformly as it is drawn through the heating zone consisting of a chamber 44 in which is arranged a spiral coil of pipe 45 and through which hot air or steam is continuously circulated.

The now completely formed web 11 emerges from the heating zone and enters between a pair of feed rolls 46 and 47 whose peripheries are formed to match the upper and lower shaped surfaces of the web 11. These rolls 46 and 47 feed the web into a cut-off saw 48 to reduce the web to usable lengths.

It is necessary to insure that the system is free of thermo-setting resin during inoperative periods of the apparatus. To remove all resin from the system, a suitable acetone solvent is placed in the tank 17 and circulated by the pump 25 through pipes 22, 23 and 24; tank 13; pipes 43 and nozzles or spray heads 42. This solvent will flush out the system preparatory to renewed operations. It is also found that in order to preclude tackiness of the resin coating from interfering with free and unrestricted passage of the web through the apparatus, all parts with which the web is brought into contact should be chrome plated and frequently cleansed with the acetone solvent.

It is evident from the foregoing that many different shapes can be produced by the process, such as exemplified in Figures 10, 11 and 12, by merely changing the die assemblies.

Manifestly, the construction as shown and described is capable of some modification and such modification as may be construed to fall within the scope and meaning of the appended claims is also considered to be within the spirit and intent of the invention.

What is claimed is:

1. A method of forming a fibrous web impregnated with a polyester resin into predetermined shapes which comprises the steps of coating the web by drawing the same through a bath of preheated thermo-setting resin, squeezing the web while traveling to uniformly distribute the coating thereon, continuously scoring the web longitudinally preliminary to shaping the web, passing the web through progressive shaping and straightening dies while in a heat induced plastic state, spraying the web with thermo-setting resin filler after hardening of said coating; passing the web through a heated zone to cure said filler and continuously circulating said resin from a preheating zone to supply said bath and spray with resin at uniform temperature.

2. A method of drawing a fibrous web impregnated with a polyester resin into predetermined shapes, comprising the steps of continuously coating said web with a preheated thermo-settnig resin; passing the coated web while still in a heat induced plastic state through progressive forming dies to gradually shape said web; spraying the web while moving and after hardening with a second coating of thermo-setting resin; continuously circulating the resin from a resin heating zone to supply the initial and said second coating of resin at a uniform temperature and finally passing said web through a uniformly heated zone for curing said web.

3. Apparatus for producing elongate articles from a fibrous web impregnated with a polyester resin, comprising a means for supporting a roll of fibrous web material, a first tank containing a predetermined quantity of thermo-setting resin, means for maintaining said resin at a predetermined temperature, a second tank containing resin, means for maintaining the resin in said second tank at a temperature equal to that in said first tank, means for submerging said web in the resin of said first tank to coat the same, a pair of squeeze rollers between which said web is passed to uniformly distribute the adhering resin thereon and to remove excess resin therefrom, a series of relatively spaced sets of dies through which said web is drawn in a heat induced plastic state to gradually and progressively shape said web, a straightening die through said web is drawn during its final hardening stage, a plurality of spray heads for spraying said web after hardening thereof, means for curing said web by the application of uniform heat, and means for recirculating said resin through said first and second tanks and to said spray heads.

4. The structure of claim 3, and a pair of scoring rolls preceding said sets of dies for scoring said web longitudinally during movement thereof preliminary to its entrance into said sets of dies to facilitate the initial shaping of said web.

5. An apparatus for producing various cross-sectional shapes in a fibrous web impregnated with a polyester resin, comprising a support for a roll of fibrous web material, a tank containing thermo-setting resin through which said web is caused to travel to coat said web, means for removing excess resin from said web while it remains in a heat induced plastic state, a series of longitudinally adjustable dies between which said web is caused to travel for gradually and progressively changing the cross-sectional shape of said web, a series of spray heads, above and below the path of said web, a second tank, pipes effecting communication between said first and second tanks and said spray heads, pump means for continuously circulating said resin through said pipes, a jacket embracing each of said tanks defining a space between the tank and jacket for circulation of hot water for maintaining uniform temperature of said circulated resin, and means for heat curing said coated web following its coating by said spray heads in a hardened state.

References Cited in the file of this patent

UNITED STATES PATENTS

| | | |
|---|---|---|
| 1,859,354 | Buttress | May 24, 1932 |
| 1,973,778 | Price | Sept. 18, 1934 |
| 2,114,377 | Goss | Apr. 19, 1938 |
| 2,466,966 | Prance et al. | Apr. 12, 1949 |
| 2,489,985 | Speight | Nov. 29, 1949 |
| 2,513,708 | Belcher | July 4, 1950 |
| 2,517,698 | Muskat | Aug. 8, 1950 |
| 2,526,945 | Gray | Oct. 24, 1950 |
| 2,547,880 | Meyer et al. | Apr. 3, 1951 |